June 11, 1940.　　W. H. BENNETT　　2,203,663
ELECTRICAL INVERTER
Filed Oct. 12, 1938
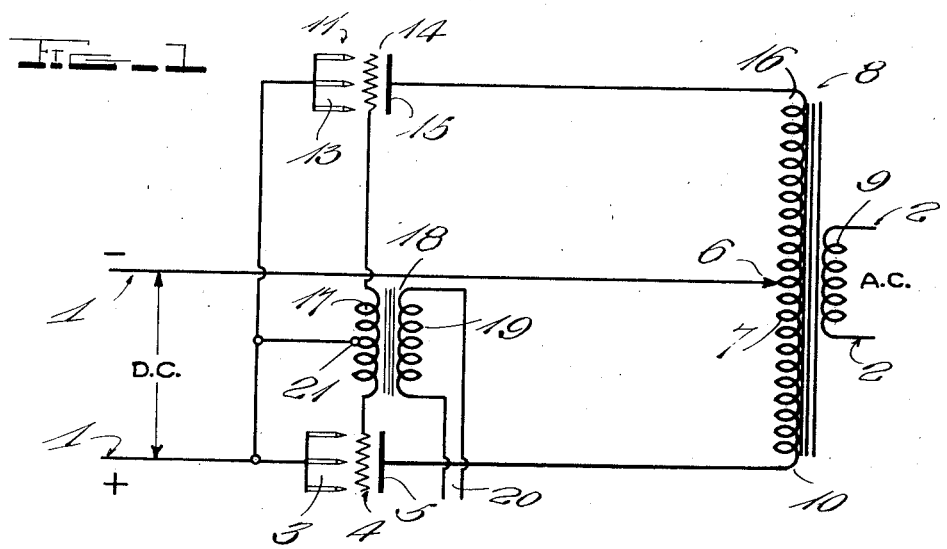
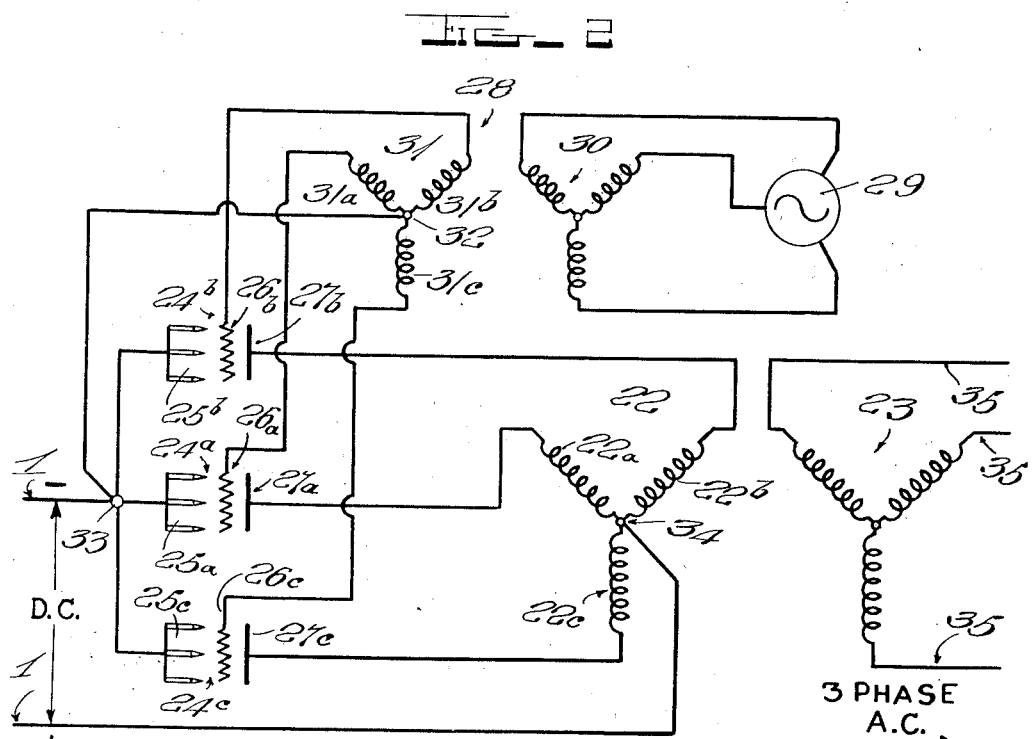
3 PHASE A.C.
INVENTOR.
WILLARD H. BENNETT
BY John B. Brady
ATTORNEY Patented June 11, 1940

2,203,663

UNITED STATES PATENT OFFICE 2,203,663

ELECTRICAL INVERTER

Willard H. Bennett, Newark, Ohio, assignor to Electronic Research Corporation, Newark, Ohio, a corporation of Ohio Application October 12, 1938, Serial No. 234,677

8 Claims. (Cl. 175—363)

My invention relates broadly to electrical inverters and more particularly to a system for obtaining low voltage alternating current of any desired frequency from a source of high potential direct current.

One of the objects of my invention is to provide a method and apparatus for inverting high potential direct current into low voltage alternating current of any desired frequency or phase.

Another object of my invention is to provide a circuit arrangement for effecting the inversion of high potential direct current into low voltage alternating current of a frequency determined by an impressed control voltage.

Still another object of my invention is to provide a circuit arrangement particularly adapted for the inversion of high potential direct current into three phase alternating current.

Other and further objects of my invention reside in the electrical circuit arrangements for an inverter as set forth more fully in the specification hereinafter following by reference to the accompanying drawing, in which:

Figure 1 shows one method and circuit arrangement for effecting the inversion of high potential direct current into low voltage alternating current of any desired frequency; and Fig. 2 illustrates a circuit arrangement for deriving three phase alternating current from an impressed direct current.

My invention is directed to an inverter employing an electric discharge system operative at approximately atmospheric pressures. The method and system of my invention do not require high vacuum discharge tubes which are a source of substantial expense and which require replacement from time to time. I utilize an arrangement of discharge electrodes which function at approximately atmospheric pressures in the establishment of a discharge from an emitter to a target under control of an associated control electrode. The frequency of the alternating current produced by the inverter is determined by a control circuit by which a control voltage is impressed upon the inverter. The system of my invention permits the delivery of alternating current to a load circuit at any desired frequency from a high potential direct current supply. Polyphase currents may be derived utilizing the method and apparatus of my invention. Three phase alternating current may be obtained at low voltage from a source of high potential direct current controlled by any suitable three phase alternating current supply of higher voltage.

Referring to the drawing in detail, reference character 1 designates the high potential input circuit for the inverter. Reference character 2 designates the low voltage alternating current output circuit of the inverter. The electric discharge apparatus includes emitters 3 and 13, control electrodes 4 and 14, and target electrodes 5 and 15, arranged to operate under substantially atmospheric pressure. The input circuit 1 connects at one side to the emitters 3 and 13 and at the other side to the center tap 6 on the primary winding 7 of the transformer 8. The transformer 8 has secondary winding 9 which connects to the output terminals 2 of the inverter. The ends 10 and 16 of the primary winding 7 connect to the target electrodes 5 and 15. The control electrodes 4 and 14 are operated from the ends of the secondary winding 17 of a transformer 18 whose center tap 21 is connected to the line joining the emitters 3 and 13. The primary 19 of the transformer 18 is connected to an alternating current source with terminals 20 which determines the frequency of the alternating current delivered at output terminals 2. High potential direct current delivered at the input circuit is inverted to provide low voltage alternating current at terminals 2 having a frequency determined by the frequency of the applied alternating current at terminals 20.

In Fig. 2, I have shown the manner in which I obtain polyphase alternating current from a high potential direct current source. The high potential direct current is supplied as before to the input circuit 1. A transformer system having a Y-connected primary system 22 and a Y-connected secondary system 23 is provided. The Y-connected primary system includes coils or windings 22a, 22b and 22c in each arm of the Y-connected system. The central point 34 of the Y-connected system is connected to the positive side of the direct current input circuit 1. An electric discharge device similar to the main discharger illustrated in Fig. 1, is connected in circuit with each of the said arms, that is, electrode assembly 24a is included in the path leading to arm 22a; electrode assembly 24b is included in the path leading to arm 22b; and electrode assembly 24c is included in the path leading to arm 22c. Each electrode assembly includes an emitter 25a, 25b, and 25c; a control electrode 26a, 26b, and 26c; and a target electrode 27a, 27b, and 27c. The emitters 25a, 25b, and 25c are connected in multiple while the target electrodes 27a, 27b, and 27c connect to the respective primary windings in the Y-connected primary system 22 for distributing the current therein in proper timed relation.

The controlling potential for each of the control electrodes 26a, 26b, and 26c, is supplied from transformer system 28 from the three phase source 29. Transformer system 28 includes Y-connected primary system 30 and Y-connected secondary system 31 in inductive relation. The windings 31a, 31b, and 31c, of the secondary system 31 connect respectively to control electrodes 26a, 26b and 26c. The common terminal 32 of the Y-connected system 31 connects to the emitters 25a, 25b and 25c as indicated at 33. The inverted output of the polyphase inversion system is delivered to terminals 35 of the Y-connected secondary system indicated at 23.

The controlling potential supplied to the respective control electrodes 26a, 26b and 26c is applied in the paths between the control electrodes and the respective emitters 25a, 25b and 25c according to the potential drop across the windings 31a, 31b and 31c in the Y-connected secondary system 31. The frequency at which the inversion occurs is determined by the frequency of the source 29 in a manner similar to the frequency at which the inversion takes place in the arrangement of Fig. 1 where the frequency of the applied source 20 determines the frequency of the resulting low voltage alternating current.

While I have illustrated a three phase inversion system, it will be understood that the system of my invention is applicable to polyphase circuits in general. It will also be noted that I have illustrated Y-connected polyphase circuits, but it will be understood that delta connecting circuits may be used in a similar manner.

The control voltage used at the terminals 20 or the source 29 may be the standard assembly alternating current which may be quite different in characteristic from the inverted alternating current delivered at terminals 2 or 35.

While I have shown my invention in certain preferred embodiments, I desire that it be understood that modifications may be made and that no limitations upon my invention are intended other than may be imposed by the scope of the appended claims.

What I claim as new and desire to secure by Letters Patent of the United States is as follows:

1. An electrical inverter for deriving polyphase energy from high potential direct current comprising a direct current input circuit, a polyphase output circuit, a polyphase circuit coupled to said polyphase output circuit and having a branch circuit individual to each phase thereof, an electric discharge device operative at substantially atmospheric pressure in circuit with each of the branches of said polyphase circuit and said direct current input circuit, and a polyphase control circuit for controlling the operating potential of each of said electric discharge devices.

2. An electrical inverter for the inversion of high potential direct current to low voltage polyphase alternating current, comprising a high potential direct current input circuit, a low voltage alternating current polyphase output circuit, a polyphase circuit coupled with the aforesaid polyphase output circuit, an electric discharge device operative at substantially atmospheric pressure individual to each of the phases of said last mentioned polyphase circuit in circuit with said direct current input circuit, and polyphase means for rendering said electric discharge devices periodically effective.

3. An electrical inverter for the inversion of high potential direct current to low voltage polyphase alternating current, comprising a high potential direct current input circuit, a low voltage polyphase alternating current output circuit, a polyphase circuit coupled with the aforesaid polyphase output circuit, an electric discharge device individual to each of the phases of said last mentioned polyphase circuit in circuit with said direct current input circuit, said electric discharge devices including an emitter, a control electrode, and a target electrode and being operative at substantially atmospheric pressure, a common connection between said emitters, a polyphase control circuit having a common connection to said last mentioned common connection, and an individual connection from each phase to the several control electrodes, and means for supplying polyphase energy to said polyphase control circuit.

4. In a three phase inverter, a high potential direct current input circuit, a three phase output circuit, a three phase coupling circuit coupled to said three phase output circuit, an electric discharge device individual to each phase of said three phase coupling circuit in circuit with said direct current input circuit, each of said devices having an emitter, a control electrode and a target electrode, and being operative at substantially atmospheric pressure, a three phase control circuit having one phase thereof individual to the control electrode of each of said electric discharge devices, and a three phase power supply circuit connected to deliver energy to said three phase control circuit.

5. In a system for inverting high potential direct current into low voltage alternating current, a high potential direct current input circuit, a low voltage alternating current output circuit, an inductive coupling circuit therebetween including an electric discharge device operative at substantially atmospheric pressure and including a control electrode, and energizing means connected with said control electrode for regulating the operation of said discharge device and the character of alternating current supplied to said output circuit.

6. In an inverter, a source of high potential direct current, a transformer having primary and secondary windings, an electric discharge device operative at substantially atmospheric pressure connected in series with said primary winding and said source of high potential direct current, whereby an electric discharge is produced in said device, a control electrode in said device, and energizing means connected with said control electrode for regulating the operation of said discharge device and the character of the current produced in said secondary winding.

7. An inverter comprising a source of high potential direct current, a transformer having a primary winding divided into two portions and a secondary winding constituting an alternating current output means, an electric discharge device operative at substantially atmospheric pressure individual to each portion of said primary winding in circuit with said source of high potential direct current, each said device including a control electrode, and means connected with the control electrodes in opposite phase for energizing said electrodes for regulating the operation of the respective discharge devices and the character of the current in said secondary winding.

8. An inverter as set forth in claim 7 and wherein the last said means comprises a transformer having a primary winding energized by alternating current and a secondary winding having opposite terminals thereof connected with the control electrodes and a center tap connection to the lower potential terminals of said discharge devices.

WILLARD H. BENNETT.